United States Patent [19]

Shinozaki et al.

[11] Patent Number: 4,810,400

[45] Date of Patent: * Mar. 7, 1989

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corporation, Tokyo, Japan

[*] Notice: The portion of the term of this patent subsequent to May 12, 2004 has been disclaimed.

[21] Appl. No.: 21,470

[22] Filed: Mar. 4, 1987

[30] Foreign Application Priority Data

Mar. 12, 1986 [JP] Japan ................................. 61-52674

[51] Int. Cl.$^4$ .............................................. H01G 9/02
[52] U.S. Cl. ..................................... 252/62.2; 361/505
[58] Field of Search ..................... 252/62.2; 361/433 E

[56] References Cited

U.S. PATENT DOCUMENTS

| | | | |
|---|---|---|---|
| 3,223,639 | 12/1965 | Powers | 252/62.2 |
| 3,293,506 | 12/1966 | Chesnot | 252/62.2 |
| 3,300,693 | 1/1967 | Ross et al. | 252/62.2 |
| 3,310,715 | 3/1967 | Shepherd | 252/62.2 |
| 4,664,830 | 5/1987 | Shwozaki et al. | 212/62.2 |

*Primary Examiner*—John F. Niebling
*Assistant Examiner*—Steven P. Marquis
*Attorney, Agent, or Firm*—James F. Haley, Jr.

[57] ABSTRACT

An electrolyte for electrolytic capacitor containing within an aprotic solvent a fluorocomplex acid salt of aniline or aniline derivative as solute.

An electrolyte for electrolytic capacitor according to the invention may conveniently be prepared by adding one equivalent amount of aniline or aniline derivative to an aqueous solution of fluorocomplex acid for reaction with subsequent vacuum drying to obtain an anhydrous salt and then dissolving said anhydrous salt to an aprotic solvent until a desired conductivity is obtained, for example, as an approximately 10% by weight solution.

3 Claims, No Drawings

ELECTROLYTE FOR ELECTROLYTIC CAPACITOR

FIELD OF THE INVENTION

This invention relates to an electrolyte for electrolytic capacitor containing within an aprotic solvent a fluorocomplex acid salt of aniline or aniline derivative as solute.

BACKGROUND OF THE INVENTION

Hitherto, organic acids or its salts and glycol series pastes have been principally used an electrolyte for electrolytic capacitor in the general purposes. The latest expansion of utilization for the electronic instruments requires more improvment and advancement in the reliability and performance of the capacitor entailing undesired problem of the presence of water in the paste and as a result an electrolyte using an aprotic solvent in place of organic acid and its salt and glycol paste has become to receive an attraction.

The greatest subject of employment of the aprotic solvent system electrolyte is how to obtain an electrolyte of high conductivity and to achieve this an organic carboxylic acid or its salt which is well soluble in the aprotic solvent and has a high degree of dissociation has been researched as a main work but not yet succeeded. To solve the matter and obtain a high conductivity a solvent which produces water resulted by the reaction between acids and alcohols or glycols and even water is incorporated into the aprotic solvent with still insufficient conductivity, increments of water and solute contents with poor reliability at the elevated temperature as disclosed in the Japanese patent publications Nos. 55-3989, 57-56763, 58-32769 and the U.S. Pat. No. 4,117,531.

After extensive researches and studies to obtain an electrolyte which is substantially nonaqueous system electrolyte and has a high conductivity with use of an aprotic solvent but without using any solvent which forms water in reaction between acids and alcohols with glycols, it has been discovered that a fluorocomplex acid salt of aniline or aniline derivative has a high solubility in the aprotic solvent with an enhanced releasability and provide a high conductivity.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by containing a fluorocomplex acid salt of aniline or aniline derivative in the aprotic solvent as solute.

PREFERRED EMBODIMENTS OF THE INVENTION

The aniline or aniline derivative according to the invention is represented by the following general formula,

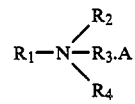

in which $R_1$ is phenyl group substituted or not substituted by alkyl group having 1 to 8 carbon atoms; $R_2$, $R_3$ and $R_4$ are independently selected from hydrogen atom or alkyl group having 1 to 8 carbon atoms; and A is a fluorocomplex acid.

The aniline derivative to be preferably used in the invention may be selected from the following but not limited thereto:
2-methylaniline, 2,6-diethylaniline, 2,4,6-tributylaniline, N,N-dimethylaniline, N-hexylaniline, N,N-diethyl-2,6-diethylaniline, N-methyl-2,6-dipentylaniline, N,N,N-trimethylphenylammonium, N,N,N-triethyl-2-butylphenylammonium.

The fluorocomplex acid to be used in the invention may be tetrafluoroboric acid ($HBF_4$) or hexafluorophosphoric acid ($HPF_6$).

The aprotic solvent to be used in the invention may be selected from the following but not limited thereto:
(1) Amide system solvent:
N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphorinamide
(2) Oxide compounds:
dimethyl sulfoxide
(3) Nitrile compounds:
acetonitrile
(4) Cyclic esters, cyclic amides:
γ-butyrolactone, N-methyl-2-pyrrolidone, ethylene carbonate, propylene carbonate.

An electrolyte for electrolytic capacitor according to the invention may conveniently be prepared by adding one equivalent amount of aniline or aniline derivative to an aqueous solution of fluorocomplex acid for reaction with subsequent vacuum drying to obtain an anhydrous salt and then dissolving said anhydrous salt to an aprotic solvent until a desired conductivity is obtained, for example, as an approximately 10% by weight solution.

EXAMPLES 1 to 10

An electrolyte for electrolytic capacitor according to the invention will be exemplified in the following with 10% by weight solution for fluorocomplex acid salt of various aniline or aniline derivatives with respect to the conductivity as shown in Table 1.

Further, as comparative example the conventional standard electrolytes composed of 78% by weight of ethylene glycol, 12% by weight of water and 10% by weight of ammonium adipate are shown also in Table 1.

TABLE 1

| Example | Fluorocomplex acid salt of aniline or its derivative | Aprotic Solvent | Conductivity (ms/cm) |
|---|---|---|---|
| 1 | aniline tetrafluoroborate | N—methyl-2-pyrrolidone | 7.4 |
| 2 | N—methylaniline tetrafluoroborate | γ-butyrolactone | 10.5 |
| 3 | 2-methylaniline | acetonitrile | 24.1 |

TABLE 1-continued

| Example | Fluorocomplex acid salt of aniline or its derivative | Aprotic Solvent | Conductivity (ms/cm) |
|---|---|---|---|
| | tetrafluoroborate | | |
| 4 | N,N,N—trimethylphenyl-ammonium tetrafluoroborate | N,N—dimethyl formamide | 16.6 |
| 5 | N,N—diethyl-2-hexylaniline tetrafluoroborate | N—methylformamide | 10.8 |
| 6 | aniline hexafluorophosphate | N—methyl-2-pyrrolidone | 7.1 |
| 7 | N—methylaniline hexafluorophosphate | γ-butyrolactone | 8.5 |
| 8 | 2-methylaniline hexafluorophosphate | acetonitrile | 19.4 |
| 9 | N,N,N—trimethylphenyl-ammonium hexafluorophosphate | N,N—dimethylformamide | 13.4 |
| 10 | N,N,N—tributyl-2,6-dipentylphenylammonium hexafluorophosphate | N—methylformamine | 8.0 |
| Ref. | ethylene glycol water ammonium adipate | 78% by weight 12% by weight 10% by weight | 6.7 |

The high-temperature load test obtained at 16 WV 180 micro F for electrolytes exemplified in examples 1 to 10 and comparative example are shown as the mean value of 10 load tests in Table 2.

TABLE 2

| | Initial Value | | | 110 deg. C. 1000 hours | | |
|---|---|---|---|---|---|---|
| Example | Capacity μF | tan δ | Leakage Current μA | Capacity μF | tan δ | Leakage Current μA |
| 1 | 178 | 0.079 | 0.54 | 169 | 0.090 | 0.50 |
| 2 | 179 | 0.071 | 0.63 | 174 | 0.083 | 0.57 |
| 3 | 183 | 0.033 | 0.58 | 167 | 0.046 | 0.53 |
| 4 | 181 | 0.054 | 0.60 | 168 | 0.071 | 0.55 |
| 5 | 179 | 0.068 | 0.56 | 168 | 0.069 | 0.52 |
| 6 | 178 | 0.080 | 0.56 | 169 | 0.095 | 0.51 |
| 7 | 178 | 0.076 | 0.60 | 174 | 0.089 | 0.53 |
| 8 | 182 | 0.046 | 0.61 | 164 | 0.061 | 0.56 |
| 9 | 180 | 0.065 | 0.59 | 167 | 0.084 | 0.56 |
| 10 | 178 | 0.078 | 0.58 | 169 | 0.072 | 0.53 |
| Ref. | 177 | 0.086 | 0.74 | 151 | 0.131 | 0.71 |

The electrolyte according to the invention may provide a non water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for electrolytic capacitor comprising an aprotic solvent and a fluorocomplex acid salt of aniline or aniline derivative of general formula,

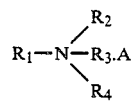

in which $R_1$ is phenyl group substituted or not substituted by alkyl group having 1 to 8 carbon atoms; $R_2$, $R_3$ and $R_4$ are independently selected from hydrogen atom or alkyl group having 1 to 8 carbon atoms; and A is a fluorocomplex acid.

2. An electrolyte for electrolytic capacitor according to claim 1, wherein aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

3. An electrolyte for electrolytic capacitor according to claim 1 or 2, wherein fluorocomplex acid is tetrafluoroboric acid or hexafluorophosphoric acid.

* * * * *